United States Patent
Chiang

(10) Patent No.: US 6,182,559 B1
(45) Date of Patent: Feb. 6, 2001

(54) ASH CATCHER ASSEMBLY FOR A CHARCOAL GRILL

(76) Inventor: Chih-Ming Chiang, 7th Fl., No. 25, Lane 33, Sec. 2, Hsing An Rd., Taichung (TW)

( * ) Notice: Under 35 U.S.C. 154(b), the term of this patent shall be extended for 0 days.

(21) Appl. No.: 09/606,855

(22) Filed: Jun. 29, 2000

(51) Int. Cl.⁷ .............................. A47J 37/00; A47J 37/07; F23J 1/00; F24B 3/00
(52) U.S. Cl. ............................... 99/340; 99/400; 99/446; 99/450; 99/482; 126/9 R; 126/25 R
(58) Field of Search ..................... 99/339, 340, 444–446, 99/400, 401, 448–450, 467, 481, 482, 352–355; 126/25 R, 9 R, 41 R, 383.1, 26, 51, 30; 403/230, 260

(56) References Cited

U.S. PATENT DOCUMENTS

| | | | | |
|---|---|---|---|---|
| 3,611,915 | * | 10/1971 | Glaser et al. | 99/446 X |
| 3,714,937 | * | 2/1973 | Linstead | 126/25 R |
| 3,734,076 | * | 5/1973 | Kiziol | 126/25 R |
| 4,390,002 | * | 6/1983 | Daily, III | 220/744 X |
| 4,453,530 | * | 6/1984 | Schlosser | 220/379 X |
| 4,523,574 | * | 6/1985 | Schlosser | 126/41 R |
| 4,635,613 | * | 1/1987 | Tucker et al. | 126/41 R |
| 4,700,618 | * | 10/1987 | Cox, Jr. | 99/340 X |
| 4,962,696 | * | 10/1990 | Gillis | 99/482 X |
| 4,962,697 | * | 10/1990 | Farrar | 99/448 X |
| 5,016,607 | * | 5/1991 | Doolittle et al. | 126/25 R |
| 5,195,423 | * | 3/1993 | Beller | 99/450 X |
| 5,467,692 | * | 11/1995 | Perez, III | 99/340 |

* cited by examiner

Primary Examiner—Timothy F. Simone
(74) Attorney, Agent, or Firm—William E. Pelton, Esq.

(57) ABSTRACT

An ash catcher assembly for catching ash falling out through openings in the bottom of a charcoal grill is disclosed. The ash catcher assembly can be assembled easily and removably mounted on the bottom of the charcoal grill. The ash catcher assembly for a charcoal grill includes a cylinder mounted on the bottom of the charcoal grill. Multiple slots are defined in the exterior edge of the cylinder opposite to the charcoal grill. The slots are essentially L-shaped and each includes a vertical portion, a horizontal portion and a vertical key directed toward the cylindrical basket. Multiple vents are defined in a line in the side of the cylinder to provide oxygen into the charcoal grill. A cylindrical basket is removably mounted on the exterior end of the cylinder to catch and hold ash and debris. Multiple stubs extend inward from side of the cylindrical basket near the top. The stubs correspond to the slots in the cylinder and are received in the slots to hold the cylindrical basket in place.

5 Claims, 5 Drawing Sheets

ASH CATCHER ASSEMBLY FOR A CHARCOAL GRILL

BACKGROUND OF THE INVENTION

1. Field of the Invention

The present invention relates to an ash catcher assembly, and more particularly to an ash catcher assembly for a charcoal grill.

2. Description of Related Art

A conventional ash catcher assembly in accordance with the prior art is removably mounted on the bottom of a charcoal grill under openings through which ash falls. With reference to FIGS. 5–6, the conventional ash catcher assembly for a charcoal grill comprises a cylindrical basket (90) for holding the ash and a detachable handle (80) connected to the cylindrical basket (90). A projection (81) extends outward from each of two ends of the handle (80) and penetrates the wall of the cylindrical basket (90). The two projections (81) cooperate with a cylindrical mounting ring (70) that has multiple slots (71) to receive the two projections (81). The mounting ring (70) is removably attached to the bottom of the charcoal grill and receives the open end of the cylindrical basket (90).

The charcoal grill is designed for burning charcoal. The cylindrical basket (90), the mounting ring (70) and the bottom of the grill form a closed chamber that can not fully provide the flow of necessary oxygen for combustion of the charcoal while burning. Furthermore, the ash will fall through the gap between the cylindrical basket (90) and the mounting ring (70) because the open end of the cylindrical basket (90) is received in the mounting ring (70).

The present invention has arisen to mitigate and/or obviate the disadvantages of the conventional ash catcher assembly for a charcoal grill.

SUMMARY OF THE INVENTION

In accordance with one aspect of the present invention, an ash catcher assembly for a charcoal grill is provided. The ash catcher assembly can catch ash and debris falling out through openings in the bottom of the charcoal grill. It is also very easy to assemble and empty. Further, the ash catcher can be easily retrofitted onto previously made charcoal grills. The ash catcher assembly in accordance with the present invention can also be easily disassembled for cleaning and storage.

According to the primary aspect of the present invention, the ash catcher assembly for a charcoal grill of the present invention is removably mounted on the bottom of the charcoal grill with multiple openings through which ash and debris fall. The ash catcher assembly for a charcoal grill includes a cylinder mounted on the bottom of the charcoal grill. The cylinder has multiple slots cut out of the lower portion and multiple vents cut out of the middle portion. A cylindrical basket, opened at the top and closed at the bottom, holds ash and debris. A handle is attached to the outside surface of the cylindrical basket. Multiple stubs extend inwardly from the side surface of the cylindrical basket near the top. The stubs correspond to slots in the cylinder and are received in the slots to hold the basket in place.

Further benefits and advantages of the present invention will become apparent after a careful reading of the detailed description with appropriate reference to the accompanying drawings.

DETAILED DESCRIPTION OF THE INVENTION

Figure 1:
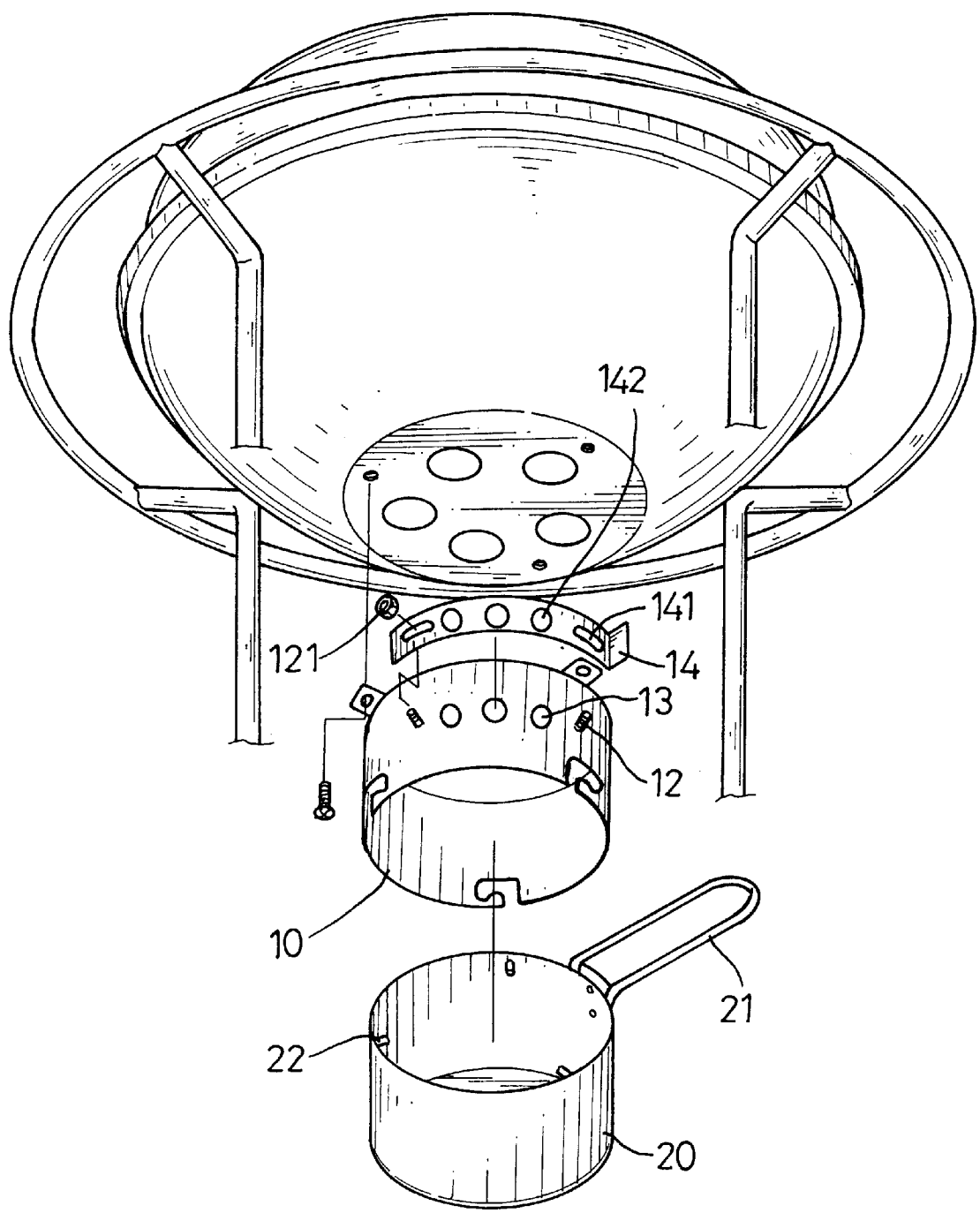
FIG. 1 is an exploded perspective view of an ash catcher assembly for a charcoal grill in accordance with the present invention.
Figure 2:
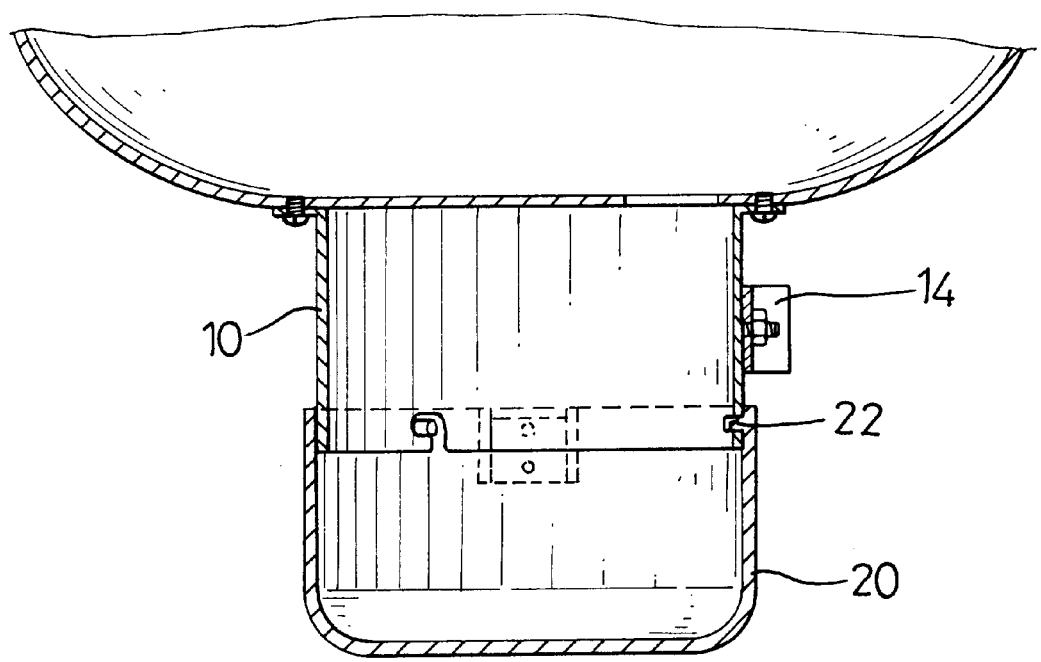
FIG. 2 is a cross sectional side plan view of the ash catcher assembly for a charcoal grill in FIG. 1.

Referring to the drawings and initially to FIGS. 1 and 2, an ash catcher assembly for a charcoal grill in accordance with the present invention comprises a cylinder (10) and a cylindrical basket (20). The cylinder (10) is mounted on the bottom of a charcoal grill. The cylindrical basket (20) is mounted on the free end of the cylinder (10). The charcoal grill has multiple openings (not numbered) defined in the bottom through which the ash and debris fall.

Figure 4:
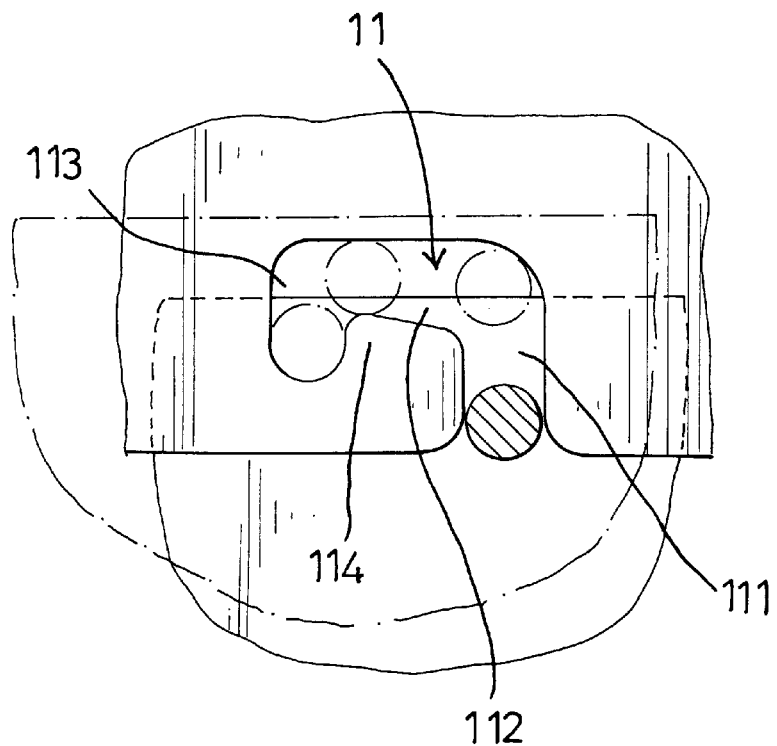
FIG. 4 is a partial front plan view showing how the stub locks in the slot.
Figure 5:
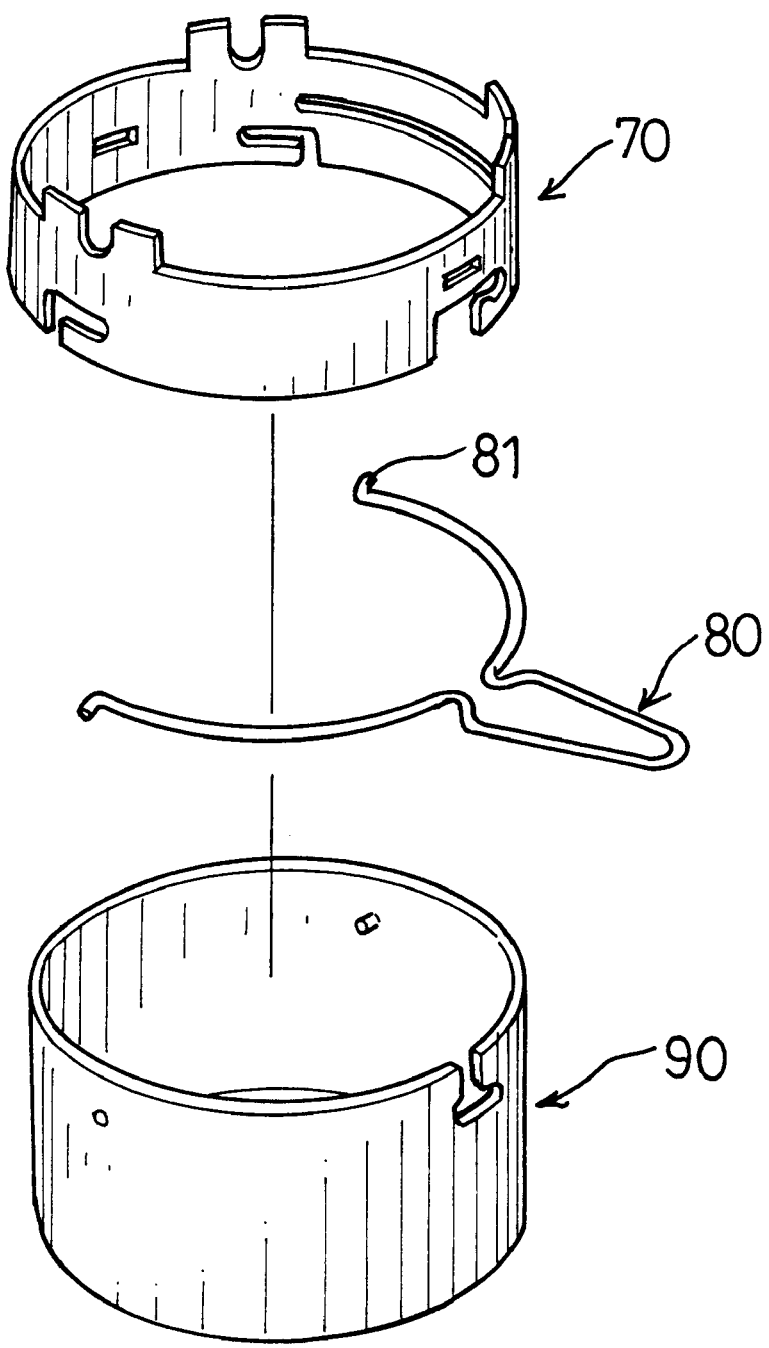
FIG. 5 is an exploded perspective view of a conventional ash catcher assembly for a charcoal grill in accordance with the prior art.
Figure 6:
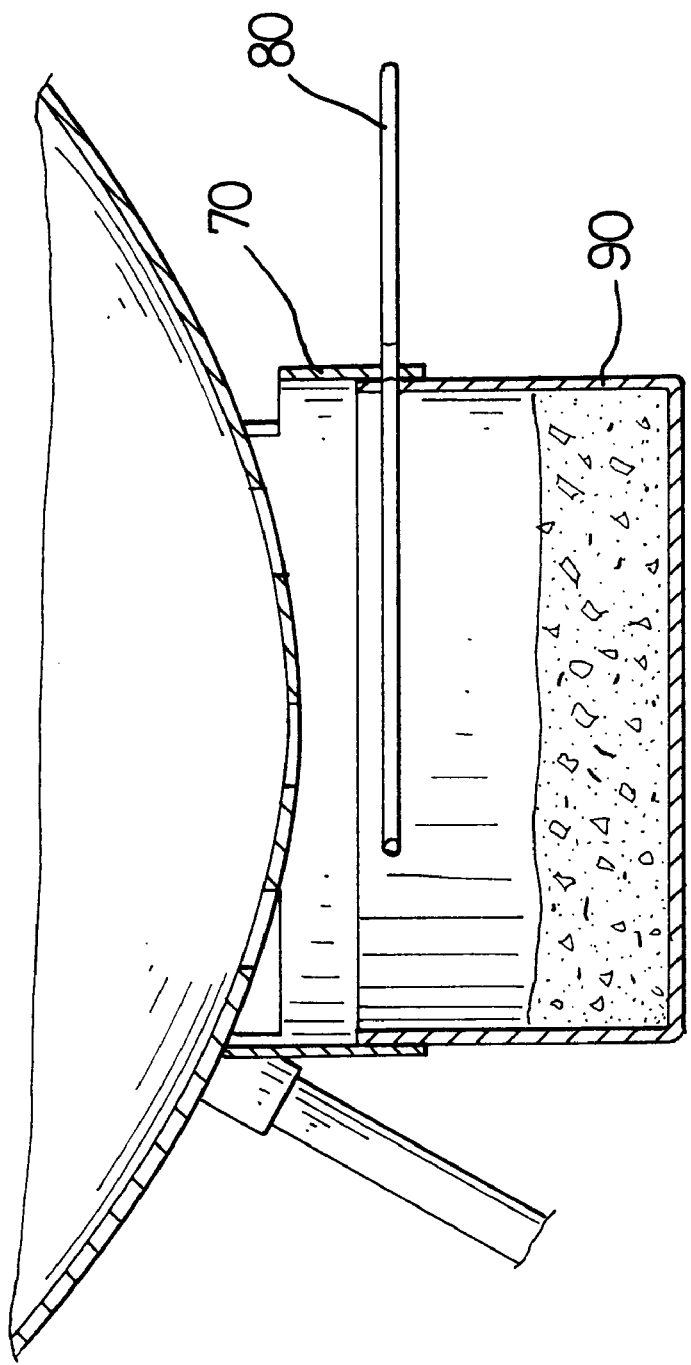
FIG. 6 is a cross sectional side plan view of the ash catcher for a charcoal grill in FIG. 6.

With reference to FIGS. 1 and 4, the cylinder (10) includes multiple slots (11) and a damper. The multiple slots (11) are defined in the edge of the cylinder (10) opposite to the charcoal grill. These slots (11) are essentially L-shaped, and each includes a vertical portion (111), a horizontal portion (112) and a vertical key (113) extending in the direction of the cylindrical basket (20). A thumb (114) is thusly formed between the vertical portion (111) and the vertical key (113) of the slot (11) to prevent the cylindrical basket (20) from detaching.

Figure 3:
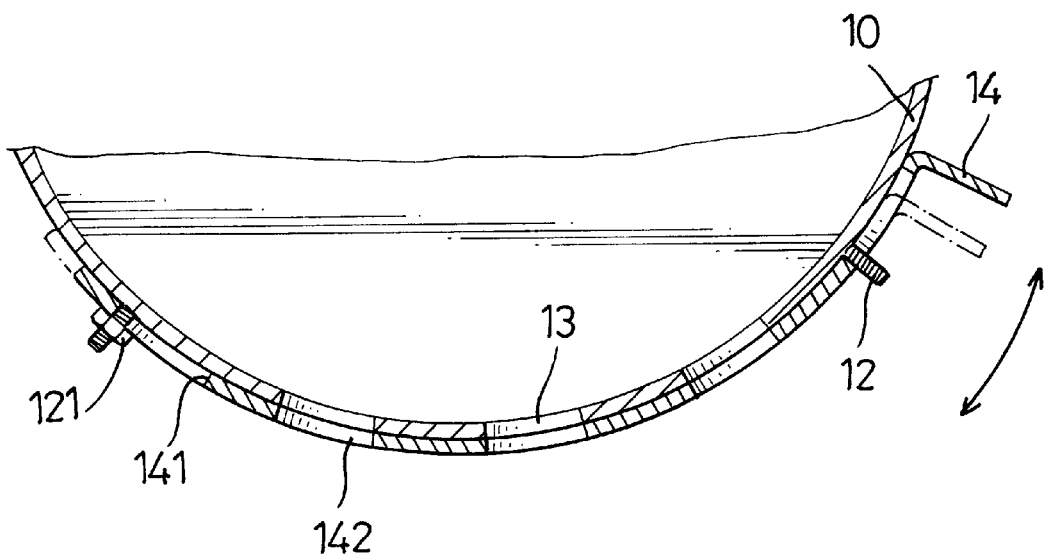
FIG. 3 is a partial cross sectional top plan view of the vents and an adjusting plate in FIG. 1.

With reference to FIGS. 1 and 3, the damper consists of two threaded stubs (12), multiple vents (13) and an arcuate adjusting plate (14). Two threaded stubs (12) extend out from the side of the cylinder (10). Multiple vents (13) are defined along the line between the two threaded stubs (12). An arcuate adjusting plate (14) movably abuts the side of the cylinder (10) over the vents (13). The adjusting plate (14) includes two horizontal slots (141) defined to correspond to the two threaded stubs (12) each extending through the horizontal slot (141). A nut (121) is screwed onto each stud (12) to hold the adjusting plate (14) in place. Multiple holes (142) are defined in the adjusting plate (14) corresponding to the vents (13). The holes (142) selectively open or close the vents (13) when the adjusting plate (14) slides on the periphery of the cylinder (10).

The cylindrical basket (20) is open at the top and closed at the bottom to catch and hold the ash and debris that falls through the holes in the bottom of the barbecue grill. A handle (21) is attached to the side of the cylindrical basket (20) to attach and detach the basket (20) with the cylinder (10). Multiple stubs (22) extend inward from the inside surface of the cylindrical basket (20) near the top. The stubs (22) correspond to the slots (11) in the cylinder (10) and are received in the slots (11) to attach the cylindrical basket (20) to the cylinder (10).

With reference to FIGS. 2 and 4, the cylindrical basket (20) has a diameter which is greater than that of the cylinder (10) so that the basket (20) slides over the outside of the cylinder (10). This ensures that all ash and debris falling through the holes in the barbecue grill fall into the basket (20). The basket (20) is attached to the cylinder (10) by sliding the stubs (22) into the vertical portion (111) of the slots (11), then rotating the basket (20) so the studs (22)

move along the horizontal portion (112) over the thumb (114) until they align with the vertical keys (113). The studs then move into the vertical keys (113) to suspend the cylindrical basket (20) on the cylinder (10).

The ash catcher assembly as described has several advantages.

1. The lower portion of the cylinder (10) is received inside the cylindrical basket (20) so that the ash and debris falling from the holes in the barbecue grill cannot fall through the gap between the cylindrical basket (20) and the cylinder (10).

2. The cylinder (10) has a damper that can be adjusted to provide the necessary oxygen for combustion of the charcoal and form a good convection of heat in the charcoal grill.

Although the invention has been explained in relation to its preferred embodiment, it is to be understood that many other possible modifications and variations can be made without departing from the spirit and scope of the invention as hereinafter claimed.

What is claimed is:

1. An ash catcher assembly removably mounted on a bottom of a charcoal grill, said charcoal grill having at least one opening in said bottom through which ash falls, said ash catcher assembly comprising:

a cylinder (10) mounted on said bottom of said charcoal grill;

multiple slots (11) defined in an edge of said cylinder (10), said slots (11) being L-shaped and each including a vertical portion (111), a horizontal portion (112) and a vertical key (113) directed toward the cylindrical basket (20);

multiple vents (13) defined in a line in a periphery of said cylinder (10) to provide oxygen into said charcoal grill;

a cylindrical basket (20) removably mounted on said exterior end of said cylinder (10) to catch and hold ash and debris; and multiple stubs (22) extending inwardly from a side of said cylindrical basket (20) near a top of said cylindrical basket (20), said stubs (22) corresponding to said slots (11) of said cylinder (10) and received in said slots (11) to hold said cylindrical basket (20) in place.

2. The ash catcher assembly for a charcoal grill as claimed in claim 1, wherein said cylinder (10) includes a thumb (114) thusly formed between said vertical portion (111) and said vertical key (113) of said slot (11) to prevent said cylindrical basket (20) from detaching.

3. The ash catcher assembly for a charcoal grill as claimed in claim 1, wherein said cylindrical basket (20) includes a handle (21) attached thereto.

4. The ash catcher assembly for a charcoal grill as claimed in claim 1, wherein said cylinder (10) includes two threaded stubs (12) extending out from said side of said cylinder (10), said two threaded stubs (12) aligned with said vents (13) and respectively situated on both sides of said vents (13).

5. The ash catcher assembly for a charcoal grill as claimed in claim 4, wherein said cylinder (10) includes:

an arcuate adjusting plate (14) movably abutting an outside surface of said cylinder (10);

two horizontal slots (141) defined in said adjusting plate (14) and corresponding to said two threaded stubs (12) each extending through one of said horizontal slots (141) and having a nut (121) screwed onto said studs (12) to hold said adjusting plate (14) in place; and multiple holes (142) defined in said adjusting plate (14) corresponding to said vents (13) to selectively open said vents (13) when said adjusting plate (14) slides on said periphery of said cylinder (10).

* * * * *